(No Model.)

A. P. VANCE.
HARROW.

No. 414,270. Patented Nov. 5, 1889.

Witnesses
Frank S. Ober
J. W. Garner

Inventor
Andrew P. Vance
By his Attorneys
C. A. Snow & Co.

UNITED STATES PATENT OFFICE.

ANDREW P. VANCE, OF RUSH HILL, MISSOURI, ASSIGNOR OF ONE-THIRD TO WILLIAM B. SOWARDS, OF SAME PLACE.

HARROW.

SPECIFICATION forming part of Letters Patent No. 414,270, dated November 5, 1889.

Application filed November 2, 1888. Serial No. 289,814. (No model.)

*To all whom it may concern:*

Be it known that I, ANDREW P. VANCE, a citizen of the United States, residing at Rush Hill, in the county of Audrain and State of Missouri, have invented a new and useful Improvement in Harrows, of which the following is a specification.

My invention relates to an improvement in flexible harrows; and it consists in the peculiar construction and combination of devices, that will be more fully set forth hereinafter, and particularly pointed out in the claims.

Figure 1:
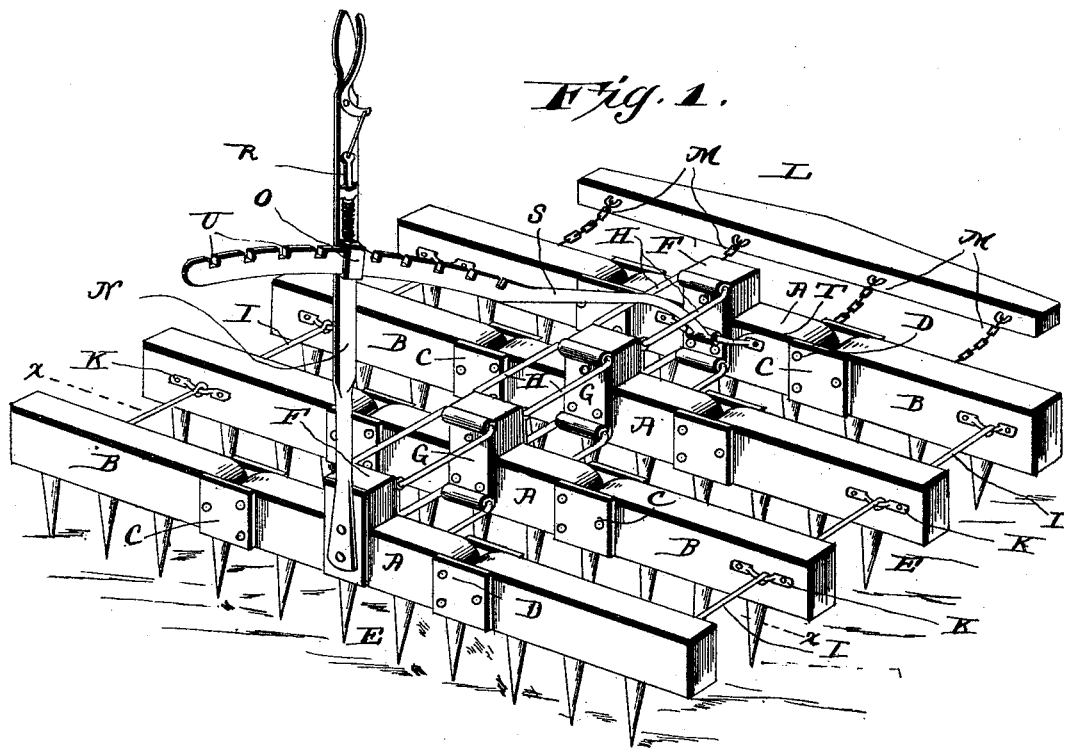
Figure 2:
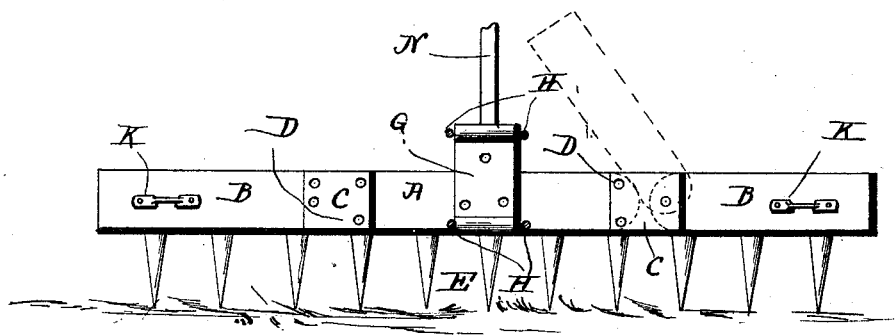

In the drawings, Figure 1 is a perspective view of a flexible harrow embodying my improvement. Fig. 2 is a transverse sectional view of the same, taken on the line $x$ $x$ of Fig. 1.

Each beam of the harrow is composed of the central section A and a pair of end sections B, the inner ends of the latter being pivotally bolted between the outer ends of pairs of plates C, which are secured to opposite sides of the sections A by bolts D and project beyond the ends of said sections A. By this means the harrow-beams are rendered flexible, so that they may conform to inequalities of the soil. The sections A B are provided on their lower side with downwardly-extending harrow-teeth E, which may be of any suitable kind.

The harrow-beams are parallel to each other, and one directly in rear of another, as shown. On the upper side of each central section A is secured a block F, and on the front and rear sides of each central section and of each block are secured vertical plates G, the latter having their upper and lower ends bent around the ends of open links H, which serve to connect the central sections together. The upper and lower ends of the plates G, which are bent around the ends of the links H, are thereby formed with eyes engaging the ends of said links.

I represents link-rods which engage keepers K or staples secured on the front and rear sides of the end-beam sections B at a suitable distance from the outer ends thereof, the said link-rods having their ends pivotally connected to the keepers or staples, as shown. By thus connecting the harrow-beams together the same are adapted to move vertically independently of each other, and by pivoting the end sections of the harrow-beam to the central sections thereof the harrow is not only adapted to conform to irregularities of the surface of the soil, but the ends of its beams may be turned upward over the central portions thereof, as illustrated in dotted lines in Fig. 2, thus narrowing the harrow and adapting the same to be stored in a comparatively small space when not in use.

L represents a draft-bar, to the center of which a whiffletree is adapted to be connected in the usual manner. The said draft-bar is connected to the center and end sections of the front harrow-beam by means of chains M.

N represents a lever, which has its lower end secured to the center of the rear harrow-beam. The said lever is provided on one side, at a suitable distance from its lower end, with a guide loop or keeper O, and is further provided with a spring-actuated locking-bolt R, of the usual form.

S represents a brace-rod, which has its front end provided with an eye that engages a loop or keeper T, which is secured on the rear side of the front harrow-beam at the center thereof. The rear end of this brace-rod is flattened, curved in the direction of its length, passes through the guide loop or keeper O, and has a series of notches U on its upper side adapted to be engaged by the locking-bolt on the lever N, whereby the latter may be secured to the brace-rod at any desired inclination, and consequently cause the rear harrow-beam to be arranged at any desired inclination, as will be readily understood. The open links H, which connect the upper and lower ends of the vertical plates in the centers of the harrow-beams, cause all of the latter to remain at all times parallel, so that when the rear harrow-beam is inclined by the lever N the remainder of the harrow-beams will be inclined in the same direction and at the same angle, and thus adapt the harrow-teeth to work at any desired angle in the ground.

A harrow thus constructed is extremely cheap and simple, is very strong and durable, is so flexible that it will readily accommodate itself to irregularities in the surface of the soil, and will be found of great practical utility.

Having thus described my invention, I claim—

1. A harrow consisting of a series of beams, vertical plates secured to the beams, links pivotally connected to the upper and lower ends of the said plates, the lever secured to the rear beam and projecting upward therefrom, the keeper on the side of the lever, the staple T on one of the beams, the brace-bar pivoted on said staple, passing through the keeper, and having notches in its upper edge, and the spring-bolt mounted on the lever and engaging said notches, as specified.

2. The harrow comprising the central beam-sections A, the pairs of plates C, rigidly secured to the ends thereof, the end beam-sections B, having their inner ends bolted between the said plates C, the pairs of vertical plates G, bolted to the centers of beams A, the links H, pivotally connected to the upper and lower ends of said plates G for the purpose set forth, the link-rods I, pivotally connecting the outer ends of the beam-sections B, the vertical hand-lever N, rigidly attached to the rearmost beam-section A, the brace-rod S, having its front end attached to a loop or keeper T on the rear side of the front harrow-beam, and devices, substantially as set forth, to attach said brace-rod to the lever at any desired adjustment of the latter, substantially as described.

In testimony that I claim the foregoing as my own I have hereto affixed my signature in presence of two witnesses.

ANDREW P. VANCE.

Witnesses:
WILLIAM SPIESS,
JOHN W. MIDDLETON.